Oct. 14, 1947.    J. A. KRATZ ET AL    2,428,849
WELDING ELECTRODE NOZZLE
Filed April 23, 1946
Fig. 1.
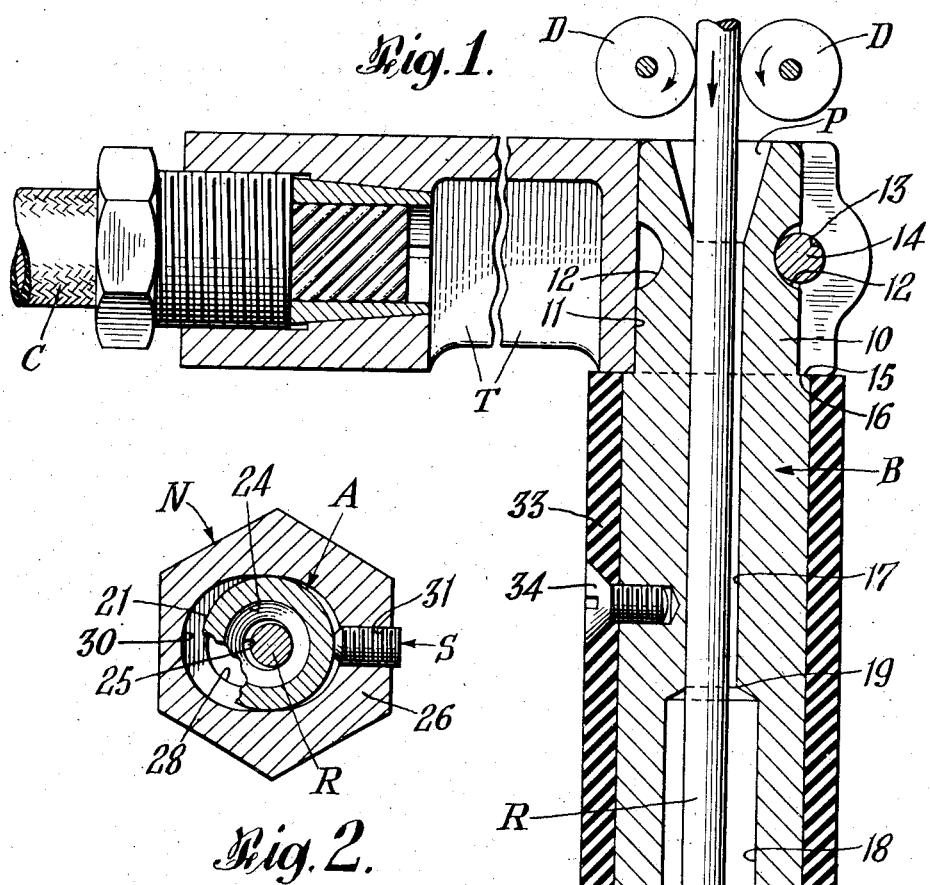
Fig. 2.
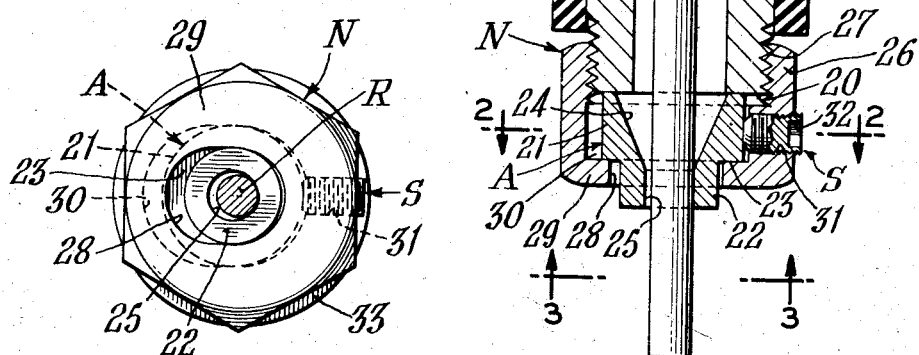
Fig. 3.
INVENTORS
JOHN A. KRATZ
HENRY G. THOMA
BY
ATTORNEY Patented Oct. 14, 1947

2,428,849

UNITED STATES PATENT OFFICE 2,428,849

WELDING ELECTRODE NOZZLE

John A. Kratz, Yonkers, N. Y., and Henry G. Thoma, Rutherford, N. J., assignors to The Linde Air Products Company, a corporation of Ohio Application April 23, 1946, Serial No. 664,155

10 Claims. (Cl. 219—8)

This invention relates to electric welding apparatus and particularly to an improved guide and contact nozzle for welding rods, especially adapted for continuous electric welding operations with consumable metal welding rods wherein the current-conducting members of the welding apparatus are required to carry very high amperage currents and wherein welding voltage stability is important.

A welding apparatus embodying this invention is useful in performing the welding process disclosed in Jones, et al. Patent No. 2,043,960, issued on June 9, 1936. In the process disclosed in this patent, welding is accomplished by passing a high amperage electric current from a consumable bare metal electrode to the work to be welded through an inorganic, electrically resistant granular welding material substantially free from substances evolving deleterious amounts of gases, which material is heaped along the joint to be welded in such quantity as to completely submerge the welding operation under a blanket of the welding material.

In a continuous electric welding operation wherein a fusible bare metal welding rod progressively slides against current-conducting members carrying high amperage welding current and establishing electrical contact with said rod, considerable arcing takes places when imperfect contact occurs, resulting in pitting and overheating of the electrode-contacting members and undesirable variations of the welding voltage; ultimately such members become so mutilated that interruption of the welding operation occurs and the members and other parts must be repaired or replaced.

The main object of the present invention is to improve the construction and operation of such electrode contacting and guiding assemblies. Other objects of the invention are to provide: an improved current-conducting nozzle adapted to supply an electric welding current to a consumable metal welding rod with a minimum of arcing; contacting means which will improve welding voltage stability; an adjustable nozzle which will insure ample and reliable constant contact with a moving electrode to avoid overheating the nozzle; a nozzle without moving parts and constructed to utilize the resilience of the metal welding rod to automatically and yieldingly bias the rod against the current-supply members which it engages.

Other objects and advantages will become apparent from the following description taken in connection with the accompanying drawing, in which:

Fig. 1 is a central longitudinal cross section of a welding electrode nozzle embodying the principles of this invention;

Fig. 2 is a transverse cross section taken on line 2—2 of Fig. 1; and

Fig. 3 is an end view taken on line 3—3 of Fig. 1.

As disclosed in the drawing, the improved nozzle comprises a main substantially tubular body or barrel B formed of conductive metal such as a copper alloy. At its rear end, the body B has a cylindrical section 10 of reduced diameter slidable into a cylindrical bore 11 of a conductive metal cable terminal T to which an electric welding current supply cable C is secured. Suitable means may be provided to detachably secure the nozzle to the terminal T. As shown, the reduced section 10 may be provided with a circumferential groove 12 which registers with a recess 13 in the bore 11. A pin 14, removably fitting the registering groove 12 and recess 13, rigidly secures the nozzle body B to the terminal T in every position of adjustment of the body B about its longitudinal axis. The pin 14 serves to clamp a shoulder 15 on the body B against a surface 16 surrounding one end of the bore 11.

During a welding operation, a fusible bare metal welding rod R may be driven by suitable rod-feeding means, such as grooved or knurled drive rollers D, through an axial passage P extending longitudinally through the nozzle body B. The passage P comprises a rear bore 17 of a diameter slightly larger than the round welding rod R and an enlarged front counterbore or chamber 18 merging with the bore 17 at the edge 19.

In the improved nozzle, the flexibility and resilience of the welding electrode are advantageously utilized to maintain ample current-conducting contact area between the nozzle and the consumable electrode R while the latter is passing through the nozzle. This is accomplished by biasing the moving electrode transversely of its direction of advance toward the welding zone, to force the electrode to slide in contact with nozzle surfaces of ample area to conduct the heavy welding current to the electrode without arcing and without interfering with satisfactory feeding of the electrode through the nozzle.

The means for transversely biasing the moving electrode R comprises an adjustable current-conducting tubular tip A which has an axial passageway therethrough for the electrode R. The tip A is held against the front end 20 of the nozzle body B by an electrically-conductive cap nut N and is adjustable transversely of its axis by a screw S carried by the nut N.

The tip A comprises two integrally-connected coaxial cylindrical sections 21 and 22; the section 21 is of larger outside diameter than the section 22, and an annular external shoulder 23 is formed between the outer cylindrical surfaces of the sections 21 and 22. The electrode passage or bore through the tip A comprises an inner frusto-conical or tapering entrance portion 24 having its larger end communicating with the bore 18 and opening at its smaller end axially into a cylindrical exit portion 25, which latter is of a diameter somewhat larger than that of the electrode R.

The nut N normally holds the inner end of the tip A in electrical contact with the end face 20 of the body B. This nut has a skirt 26 which is internally threaded to engage the external thread 27 adjacent the front end of the nozzle body B. The external surface of the skirt 26 may be polygonal or other shape to receive a tool for coupling the nut N to the body B. A hole 28, that is transversely elongated or of substantially elliptical shape, extends through the bottom wall 29 of the nut N, and the smaller section 22 of the tip A extends into or through this hole 28. Within the bottom wall 29 of the nut N and coaxial with the hole 28 there is a recess 30 which has a substantially elliptical shape similar to and coextensive with but of larger size than the hole 28. The width or smaller axis of the hole 28 is substantially equal to the diameter of the smaller tip section 22, and the width or smaller axis of the recess 30 is substantially equal to the diameter of the larger tip section 21. Thus, when the screw S is adjusted inwardly to push the tip A against the electrode R to bias the same laterally, the tip A will be accurately guided along a plane that includes the axes of the electrode R and the screw S and the major axes of the hole 28 and the recess 30.

The adjusting screw S extends through a threaded hole 31 in the skirt 26 and bears against the outer cylindrical surface of the tip section 21. The outer end of the screw S may be provided with means, such as a socket 32, to receive a tool for turning the screw to adjust the tip A and bias the electrode R into satisfactory contacting position. A sleeve 33 of electrical insulating material desirably is secured, by a screw 34, around the nozzle body B between the threaded part 27 and the surface 16 on the terminal T.

As illustrated in Fig. 1, in its operating position, the nozzle is mounted in a fixed position relatively to the electrode feed mechanism, preferably so that the pass between the feed rollers D is alined with the bore of the nozzle body B. When the electrode R is first inserted through the nozzle, the tip A desirably is positioned so that its bore is substantially centrally in line with the bore in the body B. Then, by adjusting the screw S inwardly, the tip A is moved laterally so that its bore will be misalined or slightly out of axial alinement with the bore in the body B, whereupon the nut N is tightened to clamp the tip A in its eccentric position and against the body B. This transverse adjustment of the tip A applies sufficient pressure against the yieldable and resilient welding electrode R to maintain the latter in sliding contact with the bore 17 of the nozzle body B and also in sliding contact with the bore 25 of the tip A, thereby providing and automatically maintaining ample current-conducting contact areas between the nozzle and the moving electrode. To change the biasing force applied against the electrode, it is merely necessary to slightly loosen the nut N, turn the screw S, and then re-tighten the nut N. Similarly, the bores in the body B and tip A may be re-alined, to receive another electrode, by loosening the nut N and retracting the screw S.

The improved electrode nozzle of this invention requires only a few simple parts which are relatively inexpensive and easy to manufacture, and worn parts may be replaced readily and inexpensively. While a preferred embodiment of the invention has been disclosed in detail, it will be evident that certain features may be modified without departing from the principles of the invention as defined in the appended claims.

What is claimed is:

1. In a welding electrode nozzle, in combination, an electrically-conductive body having a bore therein to receive an electrode; an electrically-conductive tip adjustably connected to one end of said body and having a bore extending therethrough and opposite one end of the bore in said body, to receive said electrode; and means for adjusting said tip and its bore transversely of the axis of said bore in said body, to yieldingly press said electrode into contact with each of said bores.

2. In a welding electrode nozzle, in combination, an electrically-conductive body having a bore extending therethrough; an electrically-conductive tip having a bore extending therethrough and communicating with one end of the bore in said body, such communicating bores being constructed and arranged for passing therethrough an elongated resilient metal welding electrode; means for adjustably securing said tip to said body; and means for adjusting said tip relatively to said body and transversely of the axes of said bores, to yieldingly bias said electrode into sliding contact with each of said bores.

3. A welding electrode nozzle for supplying electric welding current to a resilient metal welding rod, said nozzle comprising the combination of a nozzle body having a bore therein; a nut detachably connected to one end of said body; a tip detachably connected to said body by said nut, said tip having a bore extending therethrough and communicating with the bore in said body; and adjustable means carried by said nut and operable to push said tip transversely of the axes of said bores, to bias a resilient welding rod within said bores into contact with the latter.

4. A welding electrode nozzle as claimed in claim 3, wherein said nut has a skirt surrounding a portion of said tip, and said adjustable means comprises a screw extending through said skirt and operable to engage said portion of said tip within said nut.

5. A welding electrode nozzle as claimed in claim 3, wherein said nut comprises a bottom wall having a hole therethrough, and said tip has a bored portion thereof projecting into said hole.

6. A welding electrode nozzle as claimed in claim 3, wherein said nut has an internally threaded skirt detachably connecting said nut to an externally threaded portion adjacent an end of said body, said nut also comprising a bottom wall having a hole extending therethrough, an enlarged portion of said tip being disposed within said skirt between said bottom wall and said end of said body, and a smaller portion of said tip projecting into said hole.

7. A welding electrode nozzle as claimed in claim 3, wherein said nut has a bottom wall having a substantially elliptical hole therethrough and a similarly shaped recess extending around the inner end of said hole, and said tip has a portion extending into and guided by said recess and a portion extending into said hole.

8. A welding electrode nozzle for supplying electric welding current to a resilient metal welding electrode as the latter is fed through said nozzle and toward the work, said nozzle comprising the combination of an electrically-conductive nozzle body having a bore extending therethrough and having an external thread around the exit end of said bore; a cap nut having an internally threaded skirt fitting the external thread on said body and also having a bottom wall spaced from the exit end of said body, said bottom wall having a transversely elongated hole therethrough and an internal guide recess coextensive with said hole; an electrically-conductive tip detachably connected to said body by said nut and having a bore extending therethrough and communicating with the exit end of the bore in said body, said tip comprising two integrally connected sections of different diameters and a shoulder between said sections, the tip section of large diameter extending into said guide recess and the tip section of smaller diameter projecting into said hole; and an adjusting screw extending through said skirt and operable to engage said tip section of larger diameter to adjust said tip along said guide recess and transversely of the axes of said bores to bias a resilient welding rod passing through said bores into sliding contact with each of said bores.

9. In a welding electrode nozzle, in combination, two relatively adjustable nozzle members, each of said members having a bore therein and such bores communicating with one another and together providing an electrode passageway in said nozzle for receiving a resilient welding electrode; and adjustable means operable to adjust one of said members relatively to the other of said members and transversely of the axes of said bores to bias said resilient electrode into contact with each of said bores.

10. In an electric welding apparatus, in combination, electrode feeding means for feeding a resilient consumable metal electrode in the direction of its length; a stationary cable terminal for supplying electric welding current to said electrode; and an electrode nozzle comprising a body secured to said stationary terminal and having a bore therethrough substantially in line with said feeding means, and an adjustable member having a bore therethrough communicating with the bore in said body, the bore in said body and the bore in said adjustable member together constituting an electrode passageway extending through said nozzle and substantially in line with said feeding means; and means for pressing said adjustable member transversely of the axes of said bores to constantly bias such welding electrode into yielding and sliding contact with each of said bores as said welding electrode is fed through said bores toward the work.

JOHN A. KRATZ.
HENRY G. THOMA.

REFERENCES CITED

The following references are of record in the file of this patent:

UNITED STATES PATENTS

| Number | Name | Date |
| --- | --- | --- |
| 2,366,068 | Sohn | Dec. 26, 1944 |